United States Patent
Eager

(10) Patent No.: US 9,616,387 B2
(45) Date of Patent: Apr. 11, 2017

(54) EXHAUST GAS TREATMENT APPARATUS FUNCTIONALITY CHECK

(71) Applicant: Perkins Engines Company Limited, Peterborough, Cambridgeshire (GB)

(72) Inventor: Antony Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 80 days.

(21) Appl. No.: 14/416,545

(22) PCT Filed: Jul. 24, 2013

(86) PCT No.: PCT/GB2013/051980
§ 371 (c)(1),
(2) Date: Jan. 22, 2015

(87) PCT Pub. No.: WO2014/016597
PCT Pub. Date: Jan. 30, 2014

(65) Prior Publication Data
US 2015/0165379 A1    Jun. 18, 2015

(30) Foreign Application Priority Data
Jul. 27, 2012 (GB) .................................. 1213463.1

(51) Int. Cl.
*B01D 53/94* (2006.01)
*F01N 3/20* (2006.01)
(Continued)

(52) U.S. Cl.
CPC ....... *B01D 53/9495* (2013.01); *F01N 3/0253* (2013.01); *F01N 3/103* (2013.01);
(Continued)

(58) Field of Classification Search
CPC ............ B01D 2255/00; B01D 53/9495; F01N 11/002; F01N 13/009; F01N 13/0097;
(Continued)

(56) References Cited

U.S. PATENT DOCUMENTS 7,546,761 B2 *  6/2009  He .................... F01N 11/005
                                                    73/114.69
8,407,985 B2 *  4/2013  Singh ................. F01N 3/023
                                                    60/274
(Continued)

FOREIGN PATENT DOCUMENTS

CN    101395348    3/2009
CN    101988416    3/2011
(Continued)

OTHER PUBLICATIONS

European Patent Office, International Search Report in International Patent Application No. PCT/GB2013/051980, Oct. 24, 2013, 3 pp.
(Continued)

*Primary Examiner* — Maureen Wallenhorst

(57) ABSTRACT

An exhaust fluid treatment apparatus used to treat exhaust fluid emitted by a combustion engine includes a check of its functionality. A method of monitoring operation of an exhaust fluid treatment apparatus includes comparing a calculated temperature difference with an expected temperature difference associated with combustion of fuel. If the calculated temperature difference is within an acceptable margin of the expected temperature difference, further fuel injection may be permitted. If the calculated temperature difference is outside the acceptable margin of the expected temperature difference, a temperature of the exhaust gas upstream of the exhaust fluid treatment apparatus may be increased.

20 Claims, 4 Drawing Sheets

(51) Int. Cl.
*F01N 3/10* (2006.01)
*F02D 41/02* (2006.01)
*F01N 11/00* (2006.01)
*F01N 3/025* (2006.01)
*F02D 41/14* (2006.01)
*F01N 13/00* (2010.01)
*F02D 41/00* (2006.01)

(52) U.S. Cl.
CPC ............. *F01N 3/106* (2013.01); *F01N 3/208* (2013.01); *F01N 3/2033* (2013.01); *F01N 11/002* (2013.01); *F01N 13/009* (2014.06); *F01N 13/0097* (2014.06); *F02D 41/025* (2013.01); *F02D 41/1441* (2013.01); *F02D 41/1446* (2013.01); *B01D 2255/00* (2013.01); *F01N 3/2066* (2013.01); *F01N 2430/085* (2013.01); *F01N 2550/02* (2013.01); *F01N 2560/06* (2013.01); *F01N 2560/14* (2013.01); *F01N 2610/03* (2013.01); *F01N 2900/1404* (2013.01); *F01N 2900/1602* (2013.01); *F01N 2900/1621* (2013.01); *F02D 41/0052* (2013.01); *Y02T 10/26* (2013.01); *Y02T 10/47* (2013.01)

(58) Field of Classification Search
CPC .......... F01N 2430/085; F01N 2550/02; F01N 2560/06; F01N 2560/14; F01N 2610/03; F01N 2900/1404; F01N 2900/1602; F01N 2900/1621; F01N 3/0253; F01N 3/103; F01N 3/106; F01N 3/2033; F01N 3/2066; F01N 3/208; F02D 41/0052; F02D 41/025; F02D 41/1441; F02D 41/1446; Y02T 10/26; Y02T 10/47; Y10T 436/12

USPC ...... 436/37, 55, 147, 155, 159; 60/274, 286; 422/78, 82.12, 94, 109; 423/212
See application file for complete search history.

(56) References Cited

U.S. PATENT DOCUMENTS

| 8,561,393 B2* | 10/2013 | LaRose, Jr. ............. F01N 9/002 60/274 |
| 2010/0050757 A1 | 3/2010 | Liu et al. |
| 2010/0199644 A1 | 8/2010 | Gady |
| 2012/0186226 A1 | 7/2012 | Ren et al. |
| 2013/0263577 A1* | 10/2013 | Anilovich ............... F01N 3/035 60/274 |

FOREIGN PATENT DOCUMENTS

| EP | 1154131 A2 | 11/2001 |
| EP | 2216522 A1 | 8/2010 |
| FR | 2914693 A1 | 10/2008 |
| JP | 2010101200 * | 5/2010 |
| JP | 2012-127297 A | 7/2012 |
| WO | WO 2012/081460 A1 | 6/2012 |

OTHER PUBLICATIONS

United Kingdom Intellectual Property Office, Search Report in United Kingdom Patent Application No. GB1213463.1, Nov. 26, 2012, 1 p.

* cited by examiner

EXHAUST GAS TREATMENT APPARATUS FUNCTIONALITY CHECK

TECHNICAL FIELD

The disclosure relates to the field of exhaust fluid treatment and, in particular, to monitoring operation of an exhaust fluid treatment apparatus having a diesel oxidation catalyst.

BACKGROUND

An exhaust fluid treatment apparatus may comprise a plurality of modules, wherein each module is intended to treat one or more constituents of an exhaust fluid. The modules may be arranged in series such that exhaust fluid flows through each module in sequence.

An exhaust fluid treatment apparatus may comprise a diesel oxidation catalyst module, a diesel particulate filter module downstream of the diesel oxidation catalyst module and/or a selective catalytic reduction module, downstream of the diesel particulate filter module.

It may be appropriate to perform periodic checks on individual modules of the exhaust fluid treatment apparatus to ensure that the individual modules are performing as expected. This may be particularly important if unexpected performance of a module earlier in the fluid flow path may have an effect on performance of modules which are located later in the fluid flow path.

For example, unexpected performance in the diesel oxidation catalyst can result in reduced oxidation of hydrocarbons in the diesel oxidation catalyst. This, in turn, may mean that the fluid output from the diesel oxidation catalyst has a lower temperature than expected and/or desired. Such unexpected performance may also result in emission of unburnt fuel to atmosphere. Unexpected performance in the diesel oxidation catalyst may arise as a consequence of deposits, such as sulphurous deposits, collecting on the catalytic surfaces of the diesel oxidation catalyst. A reduced temperature of fluid output from the diesel oxidation catalyst can result in unexpected performance of a diesel particulate filter located downstream of the diesel oxidation catalyst since, at lower temperatures, carbon entering the diesel particulate filter in the form of soot is less likely to oxidise in the diesel particulate filter. Lower temperatures can also effect performance in a selective catalytic reduction module located downstream of the diesel particulate filter.

It is known to inject fuel into the diesel oxidation catalyst for combustion therein, for example to increase temperature in the diesel oxidation catalyst or to cause particular constituents within the diesel oxidation catalyst to be combusted. For example, it may be desirable to desulphate the exhaust fluid treatment apparatus or to remove deposits therefrom. It may be undesirable, however, to inject fuel into the diesel oxidation catalyst where the fuel may pass through the diesel oxidation catalyst without combusting. It may, therefore, be appropriate to check performance of a diesel oxidation catalyst in order to ensure that injected fuel combusts as expected.

Against this background, there is provided a method for checking operation of the diesel oxidation catalyst module.

SUMMARY OF THE DISCLOSURE

A method of monitoring operation of an exhaust fluid treatment apparatus, the apparatus comprising a diesel oxidation catalyst comprising an inlet and an outlet, the method comprising:

receiving an input temperature data value being indicative of temperature of fluid at the inlet;

injecting a first quantity of fuel upstream of the diesel oxidation catalyst for combustion in the diesel oxidation catalyst;

receiving an output temperature data value being indicative of temperature of fluid at the outlet;

calculating a calculated temperature difference between the input temperature data value and the output temperature data value and comparing the calculated temperature difference with an expected temperature difference associated with the quantity of fuel injected; and:

if the calculated temperature difference is within an acceptable margin of the expected temperature difference, injecting a second quantity of fuel into the exhaust fluid for combustion in the diesel oxidation catalyst; and if the calculated temperature difference is outside the acceptable margin of the expected temperature difference, raising a temperature of exhaust gas upstream of the inlet to the diesel oxidation catalyst.

Specific embodiments of the disclosure will now be described, by way of example only, with reference in the accompanying drawings in which:

DETAILED DESCRIPTION

Before describing the specifics of an embodiment of the method of the disclosure, the following is an explanation of the features and broad operation of an exhaust fluid treatment apparatus to which the method of the disclosure might be applied.

Figure 1:
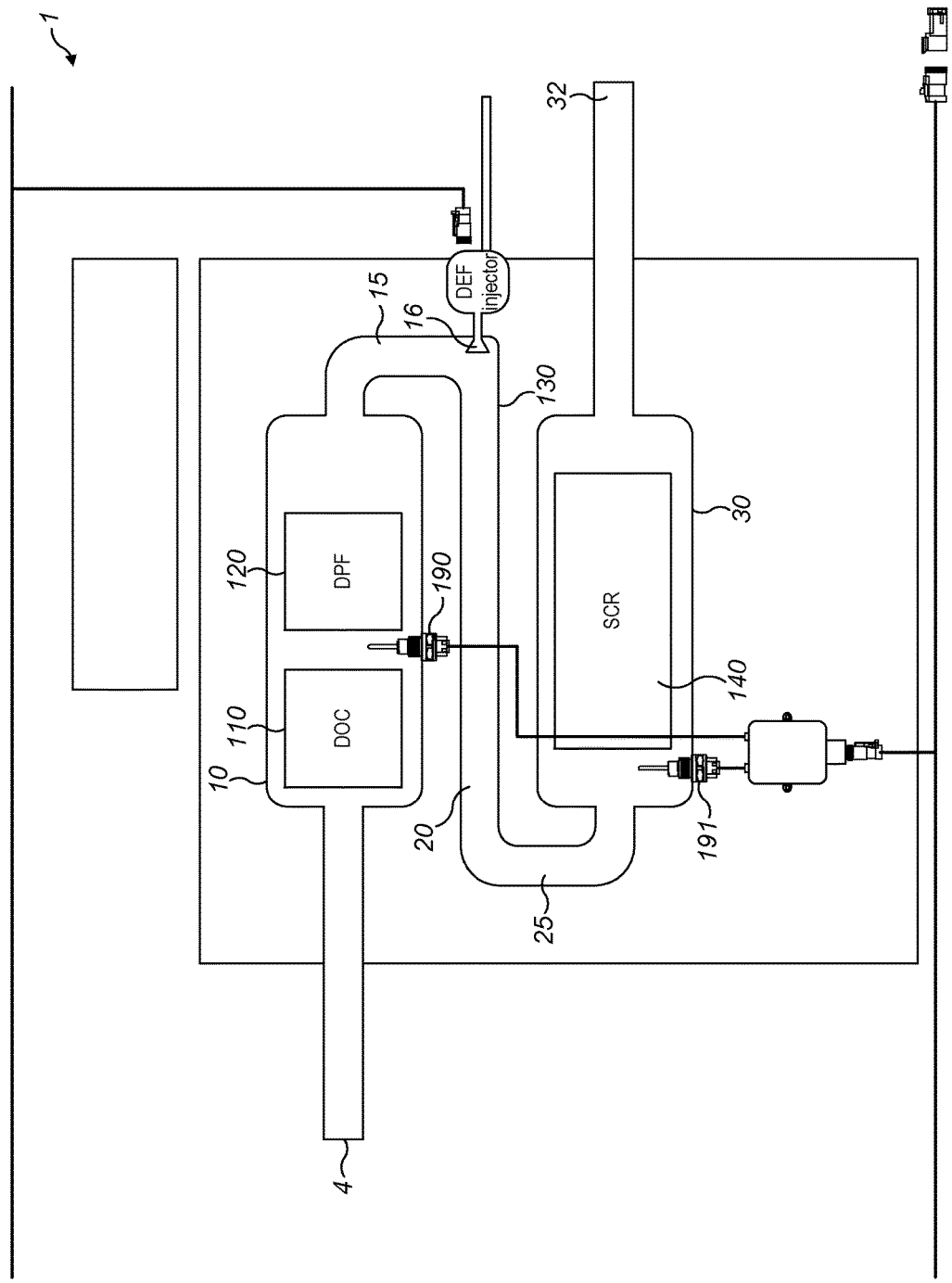
FIG. 1 shows a schematic drawing of an embodiment of an exhaust fluid treatment apparatus to which the method may be applied.
Figure 2:
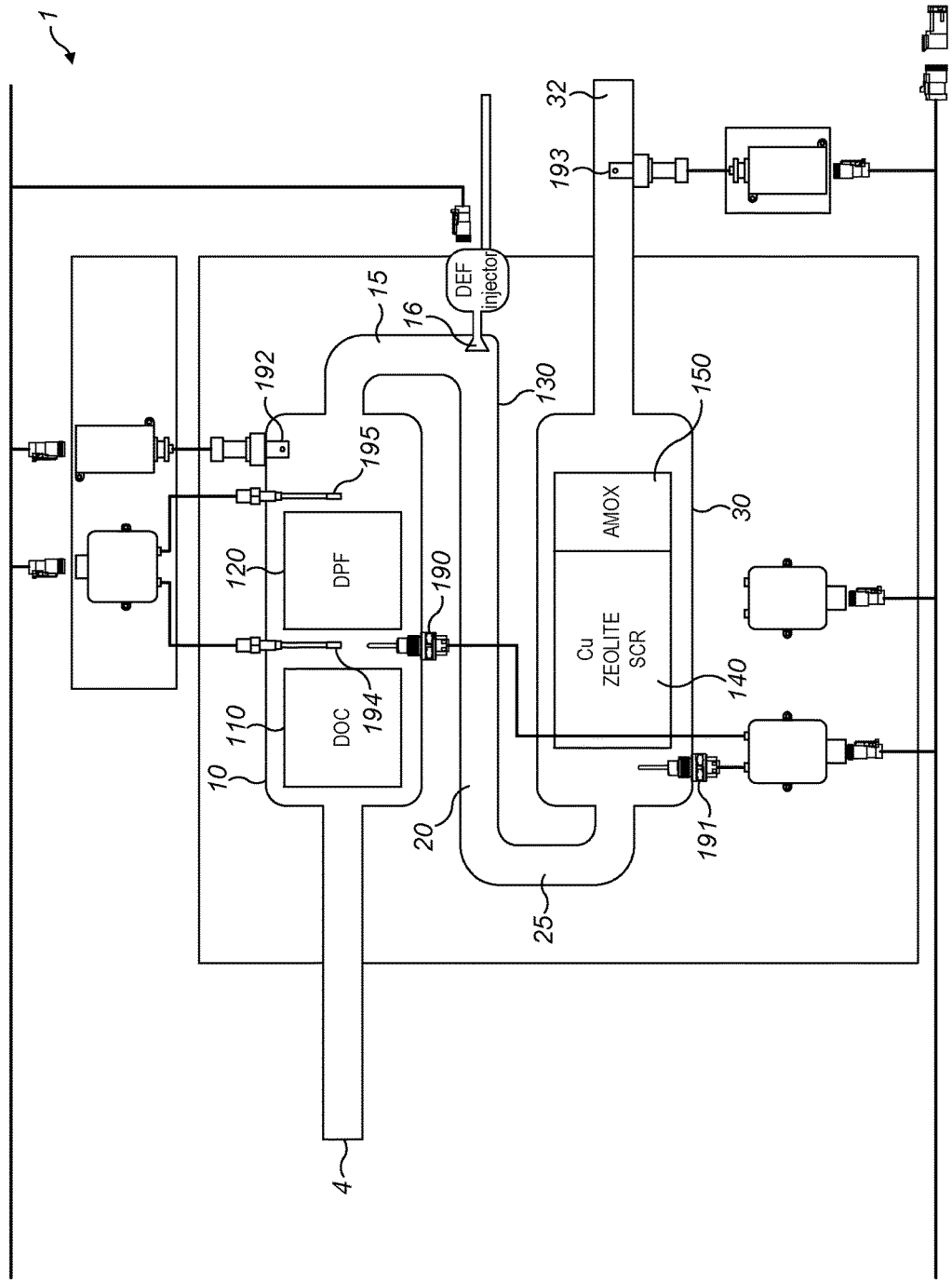
FIG. 2 shows a more detailed schematic drawing of an embodiment of an exhaust fluid treatment apparatus to which the method may be applied.
Figure 3:
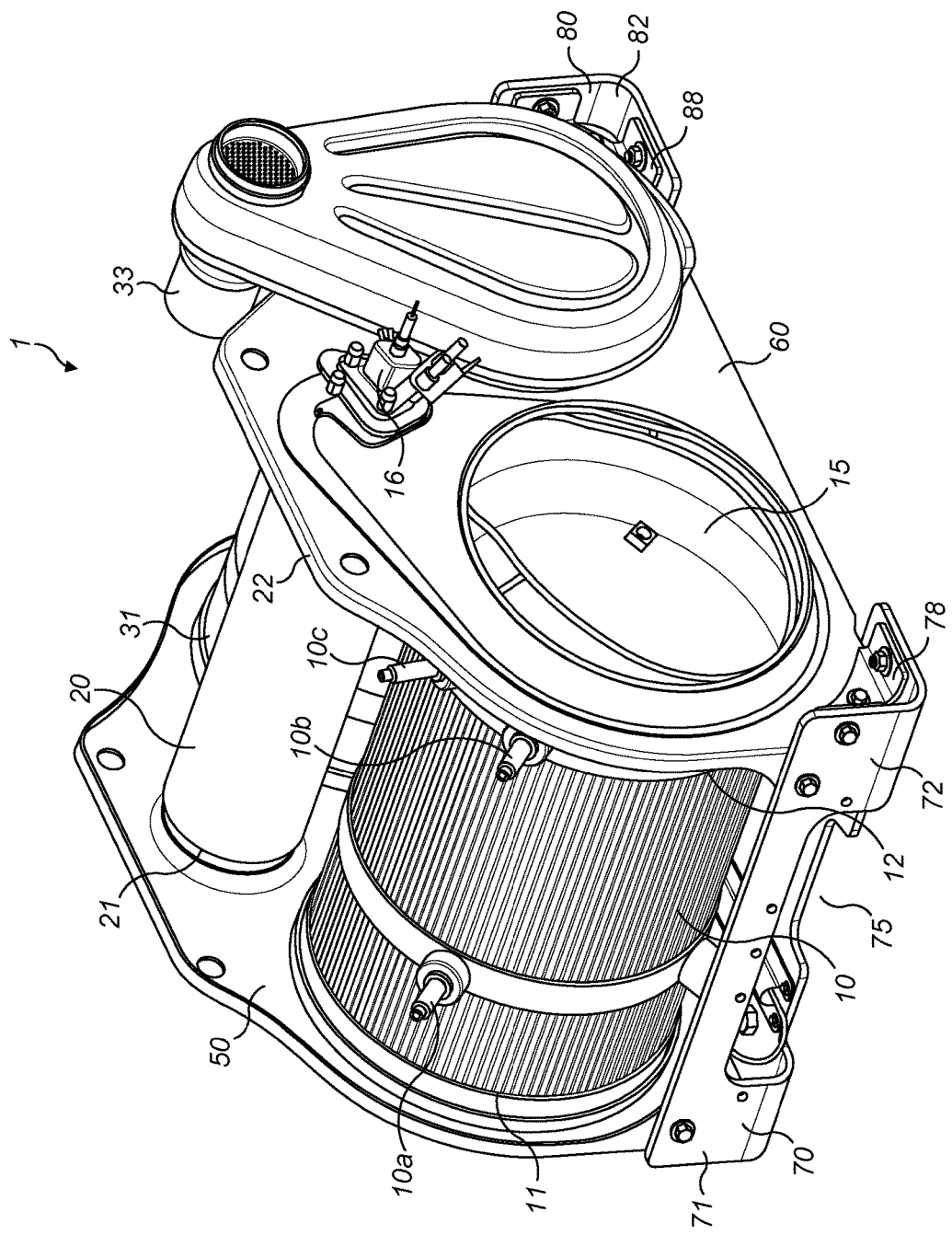
FIG. 3 shows a schematic drawing of an external appearance of the embodiment of FIG. 2.

Referring first to FIGS. 1 to 3, there is illustrated an embodiment of an exhaust fluid treatment apparatus 1. The apparatus 1 may comprise a fluid flow path through which fluid may flow sequentially through various conduits, such as a first conduit 10, a first end coupling 15, a second conduit 20, a second end coupling 25, and a third conduit 30. The first, second and third conduits 10, 20, 30 may be substantially mutually parallel.

The fluid flow path may comprise, in series, a diesel oxidation catalyst (DOC) module 110, a diesel particulate filter (DPF) module 120, a mixer module 130, a selective catalytic reduction (SCR) module 140 and/or an ammonia oxidation catalyst (AMOX) module 150.

In use, fluid may be supplied to the exhaust fluid treatment apparatus 1 via the inlet 4. Fluid may pass into the DOC module 110 in the first portion of the first conduit 10. Prior to receipt at the inlet 4, the pressure of the exhaust fluid may be controlled by a back pressure valve (not shown).

The DOC module 110 may comprise one or more catalysts, such as palladium or platinum. These materials serve as catalysts to cause oxidation of hydrocarbons ([HC]) and carbon monoxide (CO) present in the fluid flow in order to produce carbon dioxide ($CO_2$) and water ($H_2O$). The DOC may also serve to convert NO to $NO_2$ so as to achieve a $NO:NO_2$ ratio of 1:1. The catalysts may be distributed in a manner so as to maximise the surface area of catalyst material in order to increase effectiveness of the catalyst in catalysing reactions.

Fluid may flow from the DOC module 110 to the DPF module 120 which comprises features which are intended to restrict onward passage of carbon (C) in the form of soot. Carbon particles in the fluid may thus be trapped in the DPF. The DPF module 120 may be regenerated through known regeneration techniques. These techniques may involve controlling one or more of the temperature of the fluid, the pressure of the fluid and the proportion of unburnt fuel in the fluid at this point in the apparatus.

Exhaust fluid may pass from the DPF module 120 into the first end coupling 15 where it flows past the injector module 16. The injector module 16 may be associated with or attachable to a pump electronic tank unit (PETU). The pump electronic tank unit may comprise a tank for providing a reservoir for emissions fluid to be injected by the injector. Such emissions fluids may include urea or ammonia.

The PETU may further comprise a controller configured to control a volume of emissions fluid to be injected from the tank by the injector. The controller may have as inputs, for example, temperature information and quantity of $NO_x$ information which may be derived from sensors in the SCR module 140.

Emissions fluid may pass from the injector module 16 into the mixer module (not shown) located in the second conduit 20. The mixer module may comprise features for ensuring that the exhaust fluid originating from the first conduit 10 is well mixed with the emissions fluid originating from the injector 16, to create a mixed fluid.

The mixed fluid may pass from the second conduit 20 and into the SCR module located in the first portion of the third conduit via the second end coupling 25. The SCR module 140 may comprise one or more catalysts through which the mixed fluid may flow. As the mixed fluid passes over the surfaces of the catalyst a reaction may occur which converts the ammonia and $NO_x$ to diatomic nitrogen ($N_2$) and water ($H_2O$).

Fluid may pass from the SCR module 140 to the AMOX module 150 located in the second portion of the third conduit 30. The AMOX module 150 may comprise an oxidation catalyst which may cause residual ammonia present in the fluid exiting the SCR module to react to produce nitrogen ($N_2$) and water ($H_2O$).

Fluid may pass from the AMOX module 150 to the exhaust fluid treatment apparatus outlet located at the second end 32 of the third conduit 30.

As shown in FIG. 2, the exhaust fluid treatment apparatus 1 may comprise sensors for detecting characteristics of the fluids at particular stages in their flow through the exhaust fluid treatment apparatus 1. There may be a first temperature sensor (not shown) upstream of the DOC module 110, a second temperature sensor 190 between the DOC module 110 and the DPF 120 and/or a third temperature sensor 191 between the mixer module 130 and the SCR 140. There may be a first $NO_x$ sensor 192 between the DPF module 120 and the injector 16 and there may be a second $NO_x$ sensor 193 downstream of the AMOX module 150. There may also be a first soot sensor 194 immediately upstream of the DPF 120 and possibly a second soot sensor 195 immediately downstream of the DPF 120.

Having described the features and broad operation of the exhaust fluid treatment apparatus, the method of the present disclosure will now be described.

Figure 4:
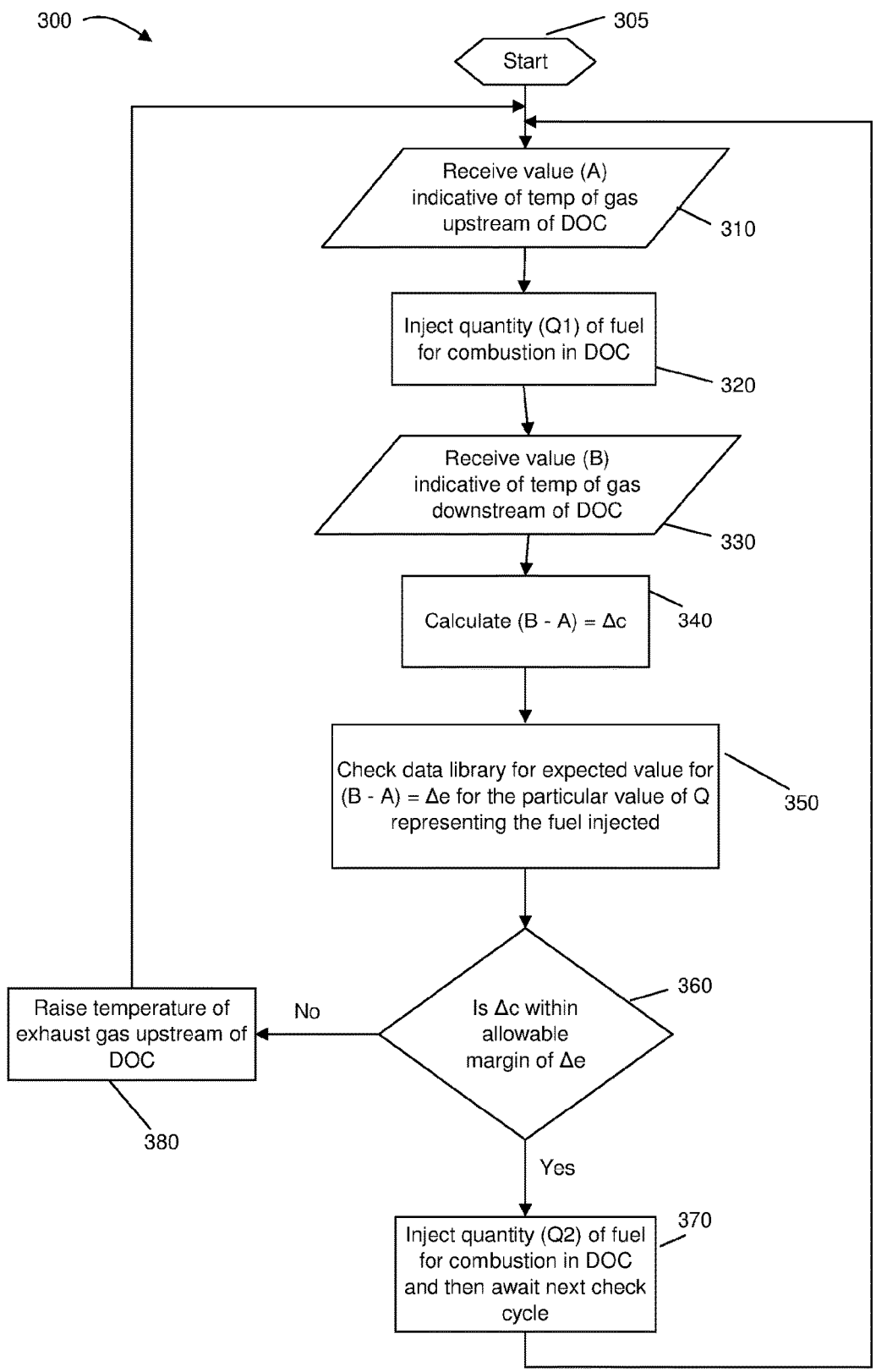
FIG. 4 shows a flow chart which illustrates an embodiment of the method of the disclosure.

Referring to FIG. 4, there is illustrated a flow chart 300 showing an embodiment of the method of the disclosure.

In use, exhaust fluid from an engine is received into an inlet 4 of the exhaust fluid treatment apparatus 1 for onward travel to the DOC module 110. The exhaust fluid has a temperature at the point where it is received into the DOC module 110. The method may involve receiving a first data value 310 relating to the temperature of fluid flowing into the DOC module 110. The temperature of the gas at the point where it is received into the DOC module 110 may not be directly measurable due to location of temperature sensors. That is, there may not be a temperature sensor immediately prior to the inlet of the DOC module 110. The method may therefore involve receiving temperature information at a point upstream of the DOC module 110 and accounting, perhaps by predictive models or similar, for likely changes in temperature between the upstream point and the inlet to the DOC module 110. Whether directly measured or not, the first data value 310 is indicative of a temperature of gas flowing into the DOC module 110.

The method may involve injecting a first quantity of unburnt fuel upstream of the DOC module 110 for oxidation in the DOC module 110. This fuel may be injected at any point upstream of the DOC module 110 such as, for example, into a combustion cylinder of an engine to which the exhaust fluid treatment apparatus may be attached (at a time in the combustion cycle when it is unlikely to combust in the cylinder). Alternatively, it may be injected directly into a conduit upstream of the DOC module 110.

The method may also involve receiving a second data value 320 relating to the temperature of fluid flowing out of the DOC module 110. This might be measured using the temperature sensor 190 located immediately downstream of the DOC.

The method may involve checking a data library to determine the expected temperature rise associated with oxidation in the DOC module 110 of the first quantity of fuel injected. The expected temperature rise may be compared with the difference between the second data value 320 and the first data value 310.

Since the temperature may be varying as a consequence of other factors (i.e. changing speed and load on the engine with which the exhaust fluid treatment apparatus is in use), the expected temperature rise may take into account the influence of such other factors in addition to the temperature difference expected from the combustion of the first quantity of fuel in the DOC module 110. This may be achieved by superimposing an expected temperature difference deemed to be attributable to the combustion of the first quantity of fuel in the DOC module 110 onto an expected temperature difference deemed to be attributable to other factors, so as to arrive at a net expected temperature difference. Alternatively, it may be achieved by seeking effectively to subtract from the total expected temperature difference a temperature difference deemed to be attributable to other factors in order to isolate a temperature difference deemed to be attributable to the combustion of the first quantity of fuel in the DOC module 110. Alternatively, the data library may comprise a plurality of different data sets each of which take into account different conditions likely to influence the temperature of gas in the DOC module 110 in order to provide an expected temperature difference for a wide range of different conditions.

The method may involve determining if the temperature difference is within an expected margin of the expected temperature difference. The expected margin of the expected temperature difference may be, for example, within 30% of the expected temperature difference. Alternatively, the expected margin of the expected temperature difference may be, for example, within 20% of the expected temperature difference.

Any change in temperature resulting from oxidation of fluid in the DOC (or resulting from changing input conditions) may occur after a delay. Moreover, the speed with which an expected temperature rise may be expected to occur may vary depending on a wide range of parameters. As such, there may be a delay between the step of receiving an input temperature data value being indicative of temperature of exhaust fluid at the inlet and the step of receiving an output temperature data value being indicative of temperature of exhaust fluid at the outlet. The duration of any delay may depend on a range of operating parameters.

It may be that a continuous flow of input temperature data values is received, each input temperature data value being indicative of temperature of fluid at the inlet. It may also be that a continuous flow of output temperature data values is received, each output temperature data value being indicative of temperature of fluid at the outlet. It may also be that the method involves comparing an input temperature data value received at a first time with an output temperature data value received at a second time, wherein the second time is after the first time, in order to allow for the expected period for the temperature to change.

In the event that the difference between the first and second data values is within the expected margin of the expected temperature rise, the method may assume that the DOC is operating within required margins. Consequently, the method may involve injecting a second quantity of fuel for combustion in the DOC module 110 since the check assumes that the second quantity of fuel will combust in the DOC module 110, thus reducing a risk that fuel will pass out of the DOC module 110 unburnt.

In the event that the difference between the first and second data values is outside the expected margin of the expected temperature rise, the method may involve increasing a temperature of the gas entering the DOC module 110. This might be achieved, for example, by moving the back pressure valve more towards the closed position therefore requiring the engine to do more work and thereby produce more heat. The backpressure valve may be located upstream of the diesel oxidation catalyst. By this method, the temperature of fluid in the DOC may increase. Alternatively, if the engine comprises exhaust gas recirculation, in may be achieved by altering the proportion of exhaust fluid being recirculated. There are a number of options for increasing the temperature of the gas entering the DOC module 110, and the method of the disclosure is not limited to any particular option. However, the number of options and extent of their possible application may be limited by a desire that the change be unnoticeable to a user.

The step of increasing a temperature of the gas entering the DOC module 110 may involve seeking to increase the temperature in the DOC from, for example, approximately 240° C. to, for example, approximately 270° C.

With age (i.e., hundreds or thousands of hours of use) DOC module 110 performance may be expected to deteriorate. When this is the case it may be appropriate, in the event that the calculated temperature difference is outside the acceptable margin of the expected temperature difference, to increase the temperature by a greater amount than when the DOC module 110 is new (or freshly refurbished or regenerated). Consequently, the method may allow for an increased temperature rise with increased age of the DOC module 110. For example, the method may involve seeking to increase the temperature in the DOC to at least, approximately 240° C. and possibly, up to approximately 290° C.

As an additional or alternative approach to possible deterioration of the DOC module 110 with age, it may be that the expected margin of the expected temperature change adjusts according to the method with age of the DOC module 110.

The method of the present disclosure may be performed periodically while the engine and exhaust fluid treatment apparatus are in normal use. Consequently, there may be a limit on the parameters which can be changed in order to increase the temperature so as to prevent the change in parameters being evident to the user of the apparatus.

As stated above, there may be a variety of reasons why and circumstances in which it may be desirable to inject into engine cylinders fuel which is intended to pass through the cylinders unburnt. One further example may be a desire to achieve desulphation of an SCR module located downstream of the DOC as part of a SCR desulphation procedure. Such a desulphation procedure may require an increased temperature in the SCR in order that sulphur combusts. The increased temperature in the SCR may be achieved by injecting unburnt fuel into the DOC (upstream of the SCR) for burning in the DOC and thereby increasing a temperature of the fluid arriving at the SCR. Such a procedure may take place intermittently and might occur only when a need for such a procedure has been identified as part of overall engine control. The method of the present invention may be used as part of this procedure.

The terms exhaust gas and exhaust fluid may be used interchangeably. The exhaust gas/fluid may include solid particles such as particles of soot which, while in the solid phase, may be understood to be a constituent of exhaust gas/fluid.

While the term data library is used in this disclosure, the data may be stored in any suitable facility for the storage of data such as a look up table.

The invention claimed is:

1. A method of monitoring and controlling operation of an exhaust fluid treatment apparatus, the apparatus comprising a diesel oxidation catalyst comprising an inlet and an outlet, the method comprising:

receiving an input temperature data value being indicative of temperature of fluid at the inlet;

injecting a first quantity of fuel into an exhaust fluid upstream of the diesel oxidation catalyst for combustion in the diesel oxidation catalyst;

receiving an output temperature data value being indicative of temperature of fluid at the outlet;

calculating a calculated temperature difference between the input temperature data value and the output temperature data value and comparing the calculated temperature difference with an expected temperature difference associated with the quantity of fuel injected; and:

only if the calculated temperature difference is within an acceptable margin of the expected temperature difference, injecting a second quantity of fuel into the exhaust fluid for combustion in the diesel oxidation catalyst; and if the calculated temperature difference is outside the acceptable margin of the expected temperature difference, raising a temperature of exhaust gas upstream of the inlet to the diesel oxidation catalyst.

2. The method of claim 1 wherein the step of raising a temperature of exhaust gas upstream of the inlet to the diesel oxidation catalyst comprises restricting passage of exhaust gas through a valve located upstream of the diesel oxidation catalyst inlet.

3. The method of claim 2 wherein the input temperature data value indicative of a temperature at the inlet is obtained by receiving a temperature indication upstream of the inlet and using a compensation factor to account for a likely temperature change between the temperature indication and the actual temperature at the inlet of the diesel oxidation catalyst.

4. The method of claim 2 wherein the expected temperature difference is modified to take into account expected changes in temperature attributable to reasons other than combustion of the first quantity of fuel in the diesel oxidation catalyst.

5. The method of claim 2 wherein the step of injecting a second quantity of fuel into the exhaust fluid for combustion in the diesel oxidation catalyst is delayed in the event of changing external conditions.

6. The method of claim 2 wherein there is a time delay between the step of receiving the input temperature value being indicative of temperature of fluid at the inlet and the step of receiving an output temperature data value being indicative of temperature of fluid at the outlet.

7. The method of claim 2 wherein the step of comparing the calculated temperature difference with an expected temperature difference comprises obtaining the expected temperature difference from a data library having an expected temperature difference associated with each possible first quantity of fuel.

8. The method of claim 1 wherein the step of raising a temperature of exhaust gas upstream of the inlet to the diesel oxidation catalyst comprises increasing the temperature of fluid at the inlet to in excess of 240° C., and in excess of 270° C.

9. The method of claim 1 wherein the input temperature data value indicative of a temperature at the inlet is obtained by receiving a temperature indication upstream of the inlet and using a compensation factor to account for a likely temperature change between the temperature indication and the actual temperature at the inlet of the diesel oxidation catalyst.

10. The method of claim 1 wherein the expected temperature difference is modified to take into account expected changes in temperature attributable to reasons other than combustion of the first quantity of fuel in the diesel oxidation catalyst.

11. The method of claim 1 wherein the step of injecting a second quantity of fuel into the exhaust fluid for combustion in the diesel oxidation catalyst is delayed in the event of changing external conditions.

12. The method of claim 1 wherein there is a time delay between the step of receiving the input temperature value being indicative of temperature of fluid at the inlet and the step of receiving an output temperature data value being indicative of temperature of fluid at the outlet.

13. The method of claim 12 wherein the time delay is dependent on an expected time taken for the first quantity of fuel to combust in the diesel oxidation catalyst.

14. The method of claim 1 wherein the step of comparing the calculated temperature difference with an expected temperature difference comprises obtaining the expected temperature difference from a data library having an expected temperature difference associated with each possible first quantity of fuel.

15. The method of claim 1 wherein the input temp data value being indicative of temperature of fluid at the inlet is obtained by:
  measuring a temperature of fluid upstream of the inlet; and
  applying a function to the measured temperature value of fluid upstream of the inlet,
  wherein said function is dependent on operating parameters and conditions so as to compensate for expected changes in temperature of the fluid between the measured temperature of the fluid upstream of the inlet and an actual temperature of the fluid at the inlet.

16. The method of claim 1 wherein the quantity of fuel to he injected into the exhaust fluid upstream of the inlet for combustion in the diesel oxidation catalyst is injected either:
  (a) into at least one cylinder of an engine to which the exhaust fluid treatment apparatus is attached in use; or
  (b) through an inlet located downstream of an engine to which the exhaust fluid treatment apparatus is attached in use.

17. The method of claim 16 wherein the injection of the fuels into a cylinder occurs when an exhaust valve of that cylinder is open.

18. An exhaust fluid treatment apparatus comprising a diesel oxidation catalyst and a controller, the diesel oxidation catalyst comprising an inlet and an outlet, the controller configured to:
  receive an input temperature data value being indicative of temperature of fluid at the inlet;
  initiate a first quantity of fuel to be injected into the exhaust fluid for combustion in the diesel oxidation catalyst;
  receive an output temperature data value being indicative of temperature of fluid at the outlet;
  calculate a calculated temperature difference between the input temperature data value and the output temperature data value and comparing the calculated temperature difference with an expected temperature difference associated with the quantity of fuel injected; and:
  only if the calculated temperature difference is within an acceptable margin of the expected temperature difference, inject a second quantity of fuel into the exhaust fluid for combustion in the diesel oxidation catalyst; and
  if the calculated temperature difference is outside the acceptable margin of the expected temperature difference, raise a temperature of exhaust gas upstream of the inlet to the diesel oxidation catalyst.

19. The exhaust fluid treatment apparatus of claim 18 wherein the controller is part of an engine control unit which controls other aspects of engine performance.

20. An engine comprising the exhaust fuel treatment apparatus and the controller of claim 18.

* * * * *